United States Patent Office 3,405,141
Patented Oct. 8, 1968

3,405,141
(OPTIONALLY 17-ALKYLATED) 17-OXYGENATED
2 - OXAESTRA - 4,9(10) - DIEN - 3 - ONES AND
$\Delta^{4,9(10),11}$ COMPOUNDS CORRESPONDING
Raphael Pappo, Skokie, and Christopher J. Jung, Morton Grove, Ill., assignors to G. D. Searle & Co., Chicago, Ill., a corporation of Delaware
No Drawing. Continuation-in-part of application Ser. No. 477,600, Aug. 5, 1965. This application July 18, 1966, Ser. No. 565,732
13 Claims. (Cl. 260—343.2)

ABSTRACT OF THE DISCLOSURE (Optionally 17-alkylated) 17-oxygenated 2-oxaestra-4,9(10)-dien-3-ones and $\Delta^{4,9(10),11}$ compounds corresponding preparable from the corresponding $\Delta^{5(10)}$ starting materials and useful as anabolic, androgenic and anti-protozoal agents. Thus, the $\Delta^{5(10)}$ compounds are contacted with bromine in the presence of a suitable base to produce the corresponding $\Delta^{4,9(10)}$ compounds, which are rearranged to the $\Delta^{5(10),9,(11)}$ double-bond isomers by means of an acidic or basic catalyst and those dienes are epoxidized. The resulting epoxides are cleaved to afford the 10β- and 11α-hydroxy intermediates which are dehydrated.

---

This application is a continuation-in-part of our copending application Ser. No. 477,600, filed Aug. 5, 1965, now abandoned.

The present invention is concerned with novel dienoic and trienoic steroidal derivatives characterized by an A-ring lactone structure and, more particularly, with (optionally 17-alkylated) 17-oxygenated 2-oxaestra-4,9(10)-dien-3-ones and the corresponding $\Delta^{4,9(10),11}$ compounds which are represented by the following structural formula

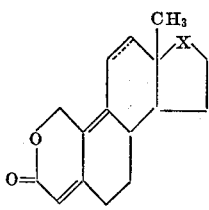

wherein the dotted line indicates the optional presence of an 11,12 double bond and X represents a carbonyl radical or a radical of the formula

Y being hydrogen, a lower alkanoyl, (lower cycloalkyl)-(lower alkanoyl), lower alkyl, lower cycloalkyl, tri-(lower alkyl)silyl, tetrahydropyran-2-yl, adamantoyl or aroyl radical, and Z is hydrogen or a lower alkyl radical.

The lower alkanoyl radicals encompassed by the foregoing structural representation are typified by formyl, acetyl, propionyl, butyryl, valeryl, caproyl, heptanoyl and the branched-chain groups isomeric therewith.

The lower alkyl radicals denoted hereinbefore are exemplified by methyl, ethyl, propyl, butyl, pentyl, hexyl, heptyl and the branched-chain isomers thereof.

Examples of the lower cycloalkyl groups depicted in the foregoing formula are cyclopentyl and cyclohexyl.

Typical of the aroyl radicals embraced by that formula are benzoyl, toluoyl and xyloyl.

The compounds of the present invention are convenient-ly manufactured by processes which utilize as starting materials compounds of the following formula

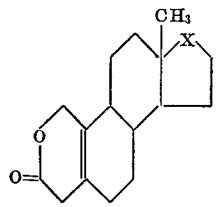

wherein X is as hereinbefore defined. Those compounds together with methods for their manufacture are described in U.S. Patent 3,246,014 and in our copending application Ser. No. 458,466, filed May 24, 1965 now having matured to U.S. 3,280,149.

When those starting materials are contacted with bromine in a suitable organic solvent such as chloroform, carbon tetrachloride or dichloromethane, in the presence of an organic base such as pyridine, collidine or triethylamine, the instant $\Delta^{4,9(10)}$ substances are produced. As a specific example, 17β-hydroxy - 17α - methyl-2-oxaestr-5(10)-en-3-one in pyridine is contacted with a solution of bromine in carbon tetrachloride at room temperature for a period of approximately 16 hours, thus resulting in 17β-hydroxy 17α-methyl-2-oxaestra-4,9(10)-dien-3-one.

The 4(5) and 9(10) double bonds of the latter $\Delta^{4,9(10)}$ compounds are isomerized to the 5(10) and 9(11) positions, respectively, by reaction with either an acidic or alkaline catalyst, thus affording the novel intermediates of the following formula

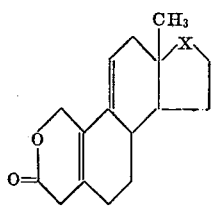

wherein X is as hereinbefore defined. An especially preferred procedure is specifically illustrated by the reaction of 17β-hydroxy-2-oxaestra-4,9(10)-dien-3-one with sodium hydroxide in aqueous methanol, thus producing 17β-hydroxy-2-oxaestra-5(10),9(11)-dien-3-one. Epoxidation of the latter intermediates affords a mixture of the corresponding 9α,11α- and 5β,10β-epoxides. In the case of the intermediates carrying a secondary hydroxy group at the 17 position, that function is preferably protected, as by acylation, prior to the epoxidation procedure. These processes are exemplified by the conversion of the aforementioned 17β-hydroxy-2-oxaestra-5(10),9(11)-dien-3-one to the corresponding 17-acetate by reaction with acetic anhydride and pyridine followed by reaction of that ester with m-chloroperbenzoic acid in dichloromethane at a temperature of about 0° to yield a mixture of 17β-acetoxy-5β,10β-epoxy-2-oxaestr-9(11)-en-3-one and 17β-acetoxy-9α,11α-epoxy-2-oxaestr-5(10)-en-3-one. Cleavage of those epoxides results in conversion of the 5β,10β-epoxides to the corresponding 10β-hydroxy derivatives and the 9α,11α-epoxides to the corresponding 11α-hydroxy novel intermediates of the following formula wherein X is as defined above. Specific examples of that cleavage process are the reactions of the above described 17β-acetoxy-5β,10β-epoxy-2-oxaestr-9(11)-en-3-one or 17β-acetoxy-9α,11α-epoxy-2-oxaestr-5(10)-en-3-one with triethylamine to afford 17β-acetoxy-10β-hydroxy-2-oxaestra-4,9(11)-dien-3-one and 17β-acetoxy-11α-hydroxy-2-oxaestra-4,9(10)-dien-3-one, respectively. When either the 10β-hydroxy or 11α-hydroxy intermediates or mixtures of the two are dehydrated, the desired Δ4,9(10),11 trienes together with the corresponding Δ1(10),4,9(11) compounds are produced. A suitable dehydration procedure is typified by the heating of a benzene solution containing 17β-acetoxy-11α-hydroxy-2-oxaestra-4,9(10)-dien-3-one and p-toluenesulfonic acid to afford 17β-acetoxy-2-oxaestra-4,9(10),11-trien-3-one and 17β-acetoxy-2-oxaestra-1(10),4,9(11)-trien-3-one, which compounds are separated by fractional crystallization. Hydrolysis of the ester group, e.g., by means of sodium hydroxide in aqueous methanol, affords 17β-hydroxy-2-oxaestra-4,9(10),11-trien-3-one and 17β-hydroxy-2-oxaestra-1(10),4,9(11)-trien-3-one, respectively.

An alternate procedure for conversion of the 11α-hydroxy intermediates to the instant Δ4,9(10),11 trienes involves conversion of that group to a suitable esterified derivative such as the p-toluenesulfonate, methanesulfonate, or lower alkanoate followed by elimination of that moiety by means of heating in a suitable eliminating medium. Particularly preferred elimination catalysts are lithium salts such as the chloride, bromide, or carbonate used in conjunction with a suitable solvent such as dimethylformamide or dimethylacetamide. 11α,17β-hydroxy-17α-methyl-2-oxaestra-4,9(10)-dien-3-one—obtained from 17β-hydroxy-17α-methyl-2-oxaestra-4,9(10)-dien-3-one by rearrangement to the Δ5(10),9(11) isomer followed by epoxidation and cleavage in the manner described above—is thus converted to the corresponding 11-acetate by reaction with acetic anhydride and pyridine, and that ester is heated in dimethylformamide with lithium chloride to yield 17β-hydroxy-17α-methyl-2-oxaestra-4,9(10),11-trien-3-one. Acylation of the instant 17-hydroxy compounds with the appropriate acid anhydride or halide, suitably in the presence of an acid acceptor such as pyridine or triethylamine, affords the corresponding acyloxy derivatives. 17β-hydroxy-2-oxaestra-4,9(10)-dien-3-one when contacted with benzoyl chloride in pyridine thus affords the corresponding 17-benzoate while 17β-hydroxy-2-oxaestra-4,9(10),11-trien-3-one yields the corresponding 17-acetate when allowed to react with acetic anhydride and pyridine.

The 10β-hydroxy intermediates can be converted to the instant Δ4,9(10),11 compounds alternatively by reaction with an isopropenyl ester. The reaction of 10β,17β-hydroxy-17α-methyl-2-oxaestra-4,9(11)-dien-3-one with isopropenyl acetate thus affords 17β-acetoxy-17α-methyl-2-oxaestra-4,9(10),11-trien-3-one.

An alternate procedure for manufacture of the instant 17-hydroxy compounds involves hydrolysis of the corresponding 17-acyloxy substances. 17β-acetoxy-2-oxaestra-4,9(10)-dien-3-one is thus contacted at room temperature with aqueous potassium carbonate in methanol to yield the desired 17β-hydroxy-2-oxaestra-4,9(10)-dien-3-one.

The instant 17β-tri-(lower alkyl)silyloxy compounds are conveniently produced by contacting the corresponding 17β-hydroxy substance with the appropriate N-tri-(lower alkyl)silylacetamide or, alternatively, with the appropriate tri-(lower alkyl)chlorosilane in pyridine solution, preferably in the presence of the corresponding silizane. The reaction of 17β-hydroxy-2-oxaestra-4,9(10)-dien-3-one with trimethylsilylacetamide, as a specific illustration, results in 17β-trimethylsilyloxy-2-oxaestra-4,9(10)-dien-3-one.

When the instant 17β-hydroxy compounds are contacted with an adamantoic acid halide, the corresponding 17-adamantoates are produced. 17β-hydroxy-2-oxaestra-4,9(10)-dien-3-one, for example, is contacted with adamantoyl chloride in pyridine to afford 17β-hydroxy-2-oxaestra-4,9(10)-dien-3-one 17-adamantoate.

The compounds of this invention are useful as a result of their valuable pharmacological properties. They display anabolic and androgenic activity, for example, with a favorable anabolic/androgenic ratio. In addition, they are anti-protozoal agents in consequence of their ability to inhibit the growth of such organisms as *Tetrahymena gelleii*.

The invention will appear more fully from the examples which follow. These examples are set forth by way of illustration only and it will be understood that the invention is not to be construed as limited either in spirit or in scope by the details contained therein as many modifications both in materials and methods will be apparent from this disclosure to those skilled in the art. In these examples, temperatures are given in degrees centigrade (° C.) and quantities of materials in parts by weight unless otherwise noted.

EXAMPLE 1

To a solution of 1.53 parts of 2-oxaestra-5(10)-ene-3,17-dione in 45 parts of pyridine is added 9.8 parts by volume of carbon tetrachloride solution containing 0.98 part of bromine. That addition requires approximately 3 minutes. After standing for about 16 hours at room temperature, the reaction mixture is concentrated to a small volume by distillation at room temperature and under reduced pressure. The residual solution is diluted with benzene, then is washed successively with water, dilute hydrochloric acid, water, dilute aqueous sodium hydroxide and water. Drying of that washed solution over anhydrous sodium sulfate followed by removal of the organic solvents by means of distillation under reduced pressure affords the residual solid crude product. Recrystallization from isopropyl alcohol results in 2-oxaestra-4,9(10)-diene-3,17-dione, melting at about 205–210.5°. A second recrystallization from benzene affords the pure substance, melting at about 213.5–216.5°. This compound is structurally illustrated by the following formula

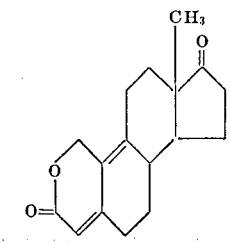

EXAMPLE 2

To a solution of 5.8 parts of 17β-hydroxy-17-α-methyl-2-oxaestr-5(10)-en-3-one in 180 parts of pyridine is added 41 parts by volume of a carbon tetrachloride solution containing 8.8 parts of bromine. After standing at room temperature for about one hour, a precipitate containing pyridine hydrobromide is formed. The reaction mixture is allowed to stand at room temperature for a total period of time consisting of approximately 16 hours, then is diluted with chloroform, and washed successively with cold dilute sodium hydroxide and water. Drying of the washed solution over anhydrous sodium sulfate followed by removal of the solvent under reduced pressure affords a residue, which is dissolved in 120 parts of methanol, then mixed with a solution of 4 parts of potassium carbonate in 100 parts of water. The latter mixture is kept at room temperature for about 3 hours, then is partially concentrated under reduced pressure at room temperature. The residue thus obtained is diluted with water, then extracted with chloroform. Washing of the chloroform layer with water followed by drying over anhydrous sodium sulfate and distillation of the solvent under reduced pressure affords a residue, which is purified by recrystallization from benzene. The pure 17β-hydroxy-17α-methyl-2-oxaestra-4,9(10)-dien-3-one thus obtained melts at about 216–221° and is characterized further by the following structural formula

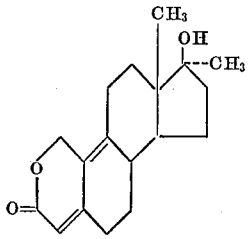

EXAMPLE 3

To a solution of one part of 17β-acetoxy-2-oxaestr-5(10)-en-3-one in 30 parts of pyridine is added 6.6 parts by volume of a carbon tetrachloride solution containing 0.58 part of bromine. After the appearance of a pyridine hydrobromide precipitate, at the end of approximately 90 minutes reaction time, the mixture is kept at room temperature for about 16 hours longer. Chloroform is then added to the reaction mixture, and the resulting diluted solution is washed successively with cold dilute sodium hydroxide and water. Drying of that washed solution over anhydrous sodium sulfate followed by distillation of the volatile organic solvents affords 17β-acetoxy-2-oxaestra-4,9(10)-dien-3-one. That compound is represented by the following structural formula

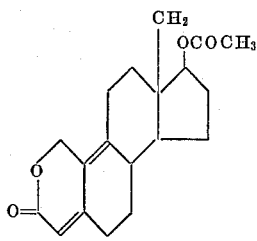

EXAMPLE 4

To a solution of 1.3 parts of 17β-acetoxy-2-oxaestra-4,9(10)-dien-3-one in 16 parts of methanol is added a solution of one part of potassium carbonate and 12.5 parts of water, and the resulting reaction mixture is allowed to stand at room temperature for about 16 hours. At the end of that reaction period, water and chloroform are added, and the organic layer is separated, washed with water, dried over anhydrous sodium sulfate and concentrated to dryness by distillation under reduced pressure. The resulting residual crude product is purified by recrystallization from benzene, thus producing 17β-hydroxy-2-oxaestra-4,9(10)-dien-3-one, melting at about 184–186°. This product is characterized by the following structural formula

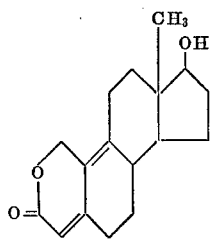

EXAMPLE 5

A mixture containing 1.5 parts of 17β-hydroxy2-oxaestra-4,9(10)-dien-3-one, 18 parts of pyridine and 9 parts of acetic anhydride is kept at room temperature for about 16 hours, then is carefully diluted with water in order to decompose unreacted acetic anhydride. The resulting aqueous mixture is extracted with chloroform, and the organic layer is separated, washed carefully with dilute hydrochloric acid, dilute aqueous potassium bi-carbonate and water, then is dried over anhydrous sodium sulfate and stripped of solvent under reduced pressure to afford 17β-acetoxy-2-oxaestra-4,9(10)-dien-3-one, identical with the product of Example 3.

EXAMPLE 6

When an equivalent quantity of propionic anhydride is substituted in the procedure of Example 5, there is obtained 17β-propionoxy-2-oxaestra-4,9(10)-dien-3-one.

EXAMPLE 7

A solution of 3.1 parts of 17β-hydroxy-2-oxaestr-5(10)-en-3-one in 45 parts of pyridine containing 24 parts of propionic anhydride is allowed to stand for about 16 hours at room temperature. At the end of that time the mixture is diluted carefully with water in order to decompose excess reagent, and the resulting aqueous mixture is partially concentrated under reduced pressure in order to remove a portion of the organic solvent. The residual solution is then diluted with water and extracted with chloroform. The chloroform layer is separated, washed successively with dilute hydrochloric acid, dilute aqueous potassium bicarbonate and water, then dried, utilizing anhydrous sodium sulfate. Distillation of the organic solvent under reduced pressure affords a crystalline residue, which is purified by recrystallization from cyclohexane, thus affording 17β-propionoxy-2-oxaestr-5(10)-en-3-one, which displays a melting point at about 109–111°.

EXAMPLE 8

When an equivalent quantity of 17β-propionoxy-2-oxaestr-5(10)-en-3-one is substituted in the procedure of Example 3, there is obtained 17β-propionoxy-2-oxaestra-4,9(10)-dien-3-one, identical with the product of Example 7.

EXAMPLE 9

A solution of 5 parts of 2-oxaestr-5(10)-ene-3,17-dione in 200 parts of methanol is heated to the reflux temperature, then is added to a stirred suspension of 28.5 parts of magnesium hydroxide in 275 parts of water, under nitrogen at about 90°. The resulting mixture is heated at the reflux temperature for about 10 minutes, then is filtered, and the filter cake is washed with hot methanol. The filtrate and washings are combined and concentrated to dryness under reduced pressure to afford a residual mixture, which is diluted with water, then extracted with ether. The aqueous layer is removed, then is concentrated to dryness under reduced pressure, and the resulting residue is extracted again with tetrahydrofuran. The organic solution thus obtained is again concentrated to dryness, then is dissolved in 135 parts of tetrahydrofuran.

Acetylene gas is passed through 135 parts of tetrahydrofuran for about one hour, after which time 100 parts by volume of an ethyl magnesium bromide solution in tetrahydrofuran is added dropwise over a period of about 30 minutes. The latter Grignard reagent is prepared from ethereal ethyl magnesium bromide by distilling off the ether while replacing that solvent with tetrahydrofuran. The resulting solution possesses a concentration of 1.5 M. The addition of acetylene gas is continued during addition of the Grignard reagent and also during the ensuing 5½ hour reaction period. At the end of that time, the aforementioned solution of the magnesium salt of 1-hydroxy-17-oxo-1,2-seco-A-nor-5α-estr-5(10)-en-2-oic acid in 135 parts of tetrahydrofuran is added, and acetylene gas is passed through the reaction mixture with stirring at room temperature for about 16 hours. Cooling of the reaction mixture in an ice bath followed by careful acidification with dilute hydrochloric acid results in decomposition of the excess reagent. That aqueous mixture is then extracted with chloroform, and the organic layer is separated, washed with water, dried over anhydrous sodium sulfate and stripped of solvent under reduced pressure to afford the crude product. Purification of the latter material is effected by dissolution in 80 parts of methanol followed by the addition of a solution of 2.5 parts of sodium hydroxide in 100 parts of water and heating of that alkaline mixture at 90–100° for about 15 minutes. The reaction mixture is concentrated to dryness under reduced pressure, then is diluted with water and extracted with chloroform. The aqueous layer is separated, acidified with dilute hydrochloric acid, heated on the steam bath for about 15 minutes, then extracted with chloroform. The chloroform layer is washed twice with dilute aqueous potassium bicarbonate, once with water, then dried over anhydrous sodium sulfate and stripped of solvent under reduced pressure. The resulting residue is purified by recrystallization from benzene to afford solvated 17α-ethynyl-17β-hydoxy - 2 - oxaestr - 5(10)-en - one, which melts at 100–110°, resolidifies, and remelts at about 154–161°. Drying of the latter solvate under reduced pressure at about 100° affords the pure compound, melting at about 176–182°.

EXAMPLE 10

To a solution of one part of 17α-ethynyl-17β-hydroxy-2-oxaestr-5(10)-en-3-one in 100 parts of benzene containing 5 parts of pyridine is added 0.1 part of 5% palladium-on-carbon catalyst, and the resulting mixture is shaken with hydrogen at atmospheric pressure and room temperature until two molecular equivalents of gas have been absorbed. At the end of that reaction period, the catalyst is removed by filtration and the filtrate is stripped of solvent under reduced pressure and at room temperature to afford 17α-ethyl-17β-hydroxy-2-oxaestr-5(10)-en-3-one.

EXAMPLE 11

When an equivalent quantity of 17α-ethyl-17β-hydroxy-2-oxaestr-5(10)-en-3-one is substituted in the procedure of Example 3, 17α-ethyl-17β-hydroxy-2-oxaestra-4,9(10) dien-3-one is obtained.

EXAMPLE 12

A mixture containing 5 parts of 6β,19-epoxy-17β-hydroxy-2-oxaandrost-4-en-3-one, 500 parts of pyridine and 50 parts of acetic anhydride is kept at room temperature for about 16 hours, then is poured carefully into a mixture of ice and water. The resulting aqueous mixture is extracted with chloroform, and the organic layer is separated, then washed successively with aqueous potassium carbonate and water, dried over anhydrous sodium sulfate and distilled to dryness under reduced pressure in order to afford the crude product. Recrystallization of that material from benzene-cyclohexane affords pure 17β-acetoxy-6β,19-epoxy-2-oxaandrost-4-en-3-one, melting at about 186–187°.

EXAMPLE 13

A mixture of 4.5 parts of 17β-acetoxy-6β,19-epoxy-2-oxaandrost-4-en-3-one with 240 parts of ethanol, 100 parts of water and 105 parts of acetic acid is stirred until homogeneous, after which time 50 parts of zinc dust and 10 parts of cupric acetate are added successively. The reaction mixture is then stirred at the reflux temperature for about one hour, following which period of time it is cooled to room temperature and filtered. The filter cake is washed with ethanol and water, and the combined filtrate and washings are concentrated to approximately ⅓ volume. The precipitate which forms during that period of concentration is removed by filtration and is washed on the filter with ethanol. This filtrate together with the washings is stripped of solvent under reduced pressure, and the resulting residue is partitioned between water and chloroform. The chloroform layer is separated, washed with water, dried over anhydrous sodium sulfate and concentrated to dryness under reduced pressure. Crystallization of the resulting residue from benzene-cyclohexane afforts 17β-acetoxy-19-hydroxy-2-oxaandrost-5-en-3-one, melting at about 181–184°.

EXAMPLE 14

To a solution of 3.3 parts of 17β-acetoxy-19-hydroxy-2-oxaandrost-5-en-3-one in 640 parts of acetone is added, at 5–7°, 8 parts by volume of an aqueous solution, 8 N in sulfuric acid and 8 N in chromium trioxide, over a period of about 5 minutes. The resulting reaction mixture is stirred at 5–7° for about one hour, then is diluted carefully with approximately 4 parts of isopropyl alcohol. The organic solvents are then removed by distillation under reduced pressure, and the resulting residue is partitioned between chloroform and water. The chloroform layer is separated, washed with water, dried over anhydrous sodium sulfate and stripped of solvent to afford 17β-acetoxy-10β-carboxy-2-oxaestr-5-en-3-one, melting at about 203–206° with decomposition.

EXAMPLE 15

When an equivalent quantity of 17β-acetoxy-10β-carboxy-2-oxaestr-5-en-3-one is substituted in the procedure of Example 7, there is obtained 17β-acetoxy-2-oxaestr-5(10)-en-3-one, melting at about 139–140.5°.

EXAMPLE 16

Method A

To a solution of 16.36 parts of 17β-hydroxy-2-oxaestra-4,9(10)-dien-3-one in 8.8 parts of methanol is added 10 parts by volume of 50% aqueous sodium hydroxide, and the resulting mixture is kept at room temperature, in a nitrogen atmosphere, for about 16 hours. At the end of that reaction period, 2.5 parts of potassium bicarbonate is added, and that alkaline mixture is washed with chloroform. The aqueous layer is separated, then made acidic by the addition of dilute hydrochloric acid. Extraction of that acidic mixture with chloroform affords on organic solution, which is kept at room temperature for about 30 minutes, then is washed successively with aqueous potassium bicarbonate and water. Drying over anhydrous sodium sulfate followed by evaporation of the solvent under reduced pressure affords the crude product, which is recrystallized from benzene to yield 17β-hydroxy-2-oxaestra-5(10),9(11)-dien-3-one, melting at about 151–159°. It displays an ultraviolet absorption maximum at about 239 millimicrons with a molecular extinction coefficient of about 17,000.

Method B

A solution of one part of 17β-hydroxy-2-oxaestra-4,9(10)-dien-3-one in 50 parts of pyridine containing 25 parts of acetic acid is heated at the reflux temperature, under nitrogen, for about 16 hours. At the end of that time, the solvents are removed by distillation under reduced pressure. To the residual material there is then added a solution of one part of potassium carbonate in 25 parts of water containing 25 parts of methanol, and that mixture is kept at room temperature for about 48 hours. Chloroform and water are added, and the aqueous layer is separated and acidified with dilute hydrochloric acid. Extraction of the resulting acidic mixture with chloroform affords an organic solution, which is washed successively with dilute sodium hydroxide and water, then dried over anhydrous sodium sulfate and concentrated to dryness under reduced pressure to afford 17β-hydroxy-2-oxaestra-5(10),9(11)-dien-3-one, identical with the product of Method A.

EXAMPLE 17

A mixture of 2.15 parts of 17β-hydroxy-2-oxaestra-5(10),9(11)-dien-3-one, 20 parts of pyridine and 7 parts of acetic anhydride is kept at room temperature for about 16 hours, then is carefully diluted with water in order to decompose the excess reagent. The resulting aqueous mixture is then diluted further with water and is extracted with chloroform. The organic layer is separated, washed successively with dilute hydrochloric acid, dilute aqueous potassium carbonate and water, then dried over anhydrous sodium sulfate and stripped of solvent by distillation under reduced pressure. Crystallization of the resulting residue from ether affords 17β-acetoxy-2-oxaestra-5(10),9(11)-dien-3-one, which displays a melting point at about 144–146°.

EXAMPLE 18

To a solution of 23.56 parts of 17β-acetoxy-2-oxaestra-5(10),9(11)-dien-3-one in 536 parts of methylene chloride is added 15.74 parts of m-chloroperbenzoic acid at approximately 0°, and the reaction mixture is stored at that temperature for about 72 hours. Dilution of the reaction mixture with benzene, at the end of that time, affords an organic solution which is washed successively with cold aqueous sodium hydroxide and water, then is dried over anhydrous sodium sulfate and evaporated to dryness under reduced pressure. The resulting gummy residue is purified by recrystallization from ether to afford 17β-acetoxy - 5β,10β-epoxy-2-oxaestr-9(11)-en-3-one, melting at about 170–183°. The ether solution from that recrystallization contains 17β-acetoxy-9α,11α-epoxy-2-oxaestr-5(10)-en-3-one.

EXAMPLE 19

To the ether solution containing 17β-acetoxy-9α,11α-epoxy-2-oxaestr-5(10)-en-3-one there is added 36.5 parts of triethylamine, and the resulting mixture is heated at the reflux temperature, under nitrogen, for about one hour. The solvent is then removed by distillation under reduced pressure, and the residue is dissolved in benzene. The resulting organic solution is washed successively with cold dilute aqueous sodium hydroxide and water, then dried over anhydrous sodium sulfate. Removal of the solvent by distillation under reduced pressure followed by recrystallization of the resulting residue from ether-benzene affords 17β-acetoxy-11α-hydroxy-2-oxaestra-4,9(10)-dien-3-one, melting at about 133.5–135.5°. This compound exhibits an ultraviolet absorption maximum at about 286 millimicrons with a molecular extinction coefficient of about 14,500.

EXAMPLE 20

A mixture of 7.5 parts of 17β-acetoxy-5β,10β-epoxy-2-oxaestr-9(11)-en-3-one with 365 parts of triethylamine is heated at the reflux temperature, in a nitrogen atmosphere, for about one hour, then is stripped of solvent by distillation at reduced pressure, under nitrogen. The resulting residue is extracted into benzene, and the benzene solution is washed successively with dilute hydrochloric acid, dilute aqueous sodium hydroxide and water, then dried over anhydrous sodium sulfate. Removal of the solvent by distillation under reduced pressure affords the residual crude product, which is purified by recrystallization from ether to yield 17β-acetoxy-10β-hydroxy-2-oxaestra-4,9(11)-dien-3-one, melting at about 128–145°. This compound exhibits an ultraviolet absorption maximum at about 220 millimicrons.

EXAMPLE 21

Method A

A mixture of 5.8 parts of 17β-acetoxy-11α-hydroxy-2-oxaestra-4,9(10)-dien-3-one and 2.3 parts of p-toluenesulfonic acid monohydrate in 2,640 parts of dry benzene is distilled slowly in a nitrogen atmosphere for about 45 minutes. The reaction mixture is then cooled to 0–5° and washed successively with cold aqueous sodium hydroxide and water, then is dried over anhydrous sodium sulfate and evaporated to dryness under reduced pressure to afford a partially crystalline product containing 17β-acetoxy-2-oxaestra-4,9(10),11-trien-3-one and 17β-acetoxy-2-oxaestra-1(10),4,9(11)-trien-3-one.

Method B

The substitution of an equivalent quantity of 17β-acetoxy-10β-hydroxy-2-oxaestra-4,9(11)-dien-3-one in the procedure of Method A also affords a mixture of 17β-acetoxy-2-oxaestra-4,9(10),11-trien-3-one and 17β-acetoxy-2-oxaestra-1(10),4,9(11)-trien-3-one.

Method C

To 7.63 parts of a mixture containing 17β-acetoxy-11α-hydroxy-2-oxaestra-4,9(10)-dien-3-one and an 17β-acetoxy-10β-hydroxy-2-oxaestra-4,9(11)-dien-3-one dissolved in 440 parts of benzene is added 0.45 part of p-toluenesulfonic acid monohydrate and the resulting reaction mixture is slowly distilled in a nitrogen atmosphere for about 25 minutes. At the end of that time, the mixture is cooled, then stirred for about 5 minutes with cold water and washed successively with 5% aqueous sodium hydroxide and water. Drying of that solution over anhydrous sodium sulfate followed by evaporation of the solvent under reduced pressure affords the residual crude product which is fractionally crystallized from ether. The solid material thus obtained is 17β-acetoxy-2-oxaestra-1(10),4,9(11)-trien-3-one, which melts at about 144–148° and exhibits an ultraviolet absorption maximum at about 250 millimicrons with a molecular extinction coefficient of about 19,000.

The ether filtrate from the foregoing recrystallization is dissolved in 32 parts of methanol, and the resulting solution is diluted with 20 parts by volume of 5% aqueous sodium hydroxide. That solution is allowed to stand at room temperature, in a nitrogen atmosphere, for about 4 hours, then is cooled and diluted with water. That aqueous mixture is washed with benzene, then is acidified to pH 5 by the addition of acetic acid. Extraction of the acidic mixture with benzene affords an organic solution, which is washed successively with dilute aqueous sodium hydroxide and water, then is dried over anhydrous sodium sulfate. Evaporation of the solvent under reduced pressure affords the crystalline solid product, which is purified by recrystallization from isopropyl alcohol to yield pure 17β-hydroxy-2-oxaestra-4,9(10),11-trien-3-one, melting at about 219–226°. This compound exhibits ultraviolet absorption maxima at about 230 and 326 millimicrons with molecular extinction coefficients of about 6400 and 26,400, respectively. It is represented by the following structural formula

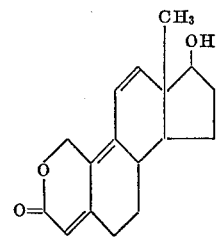

EXAMPLE 22

To a solution of 15 parts of 17β-hydroxy-17α-methyl-2-oxaestra-4,9(10)-dien-3-one in 84 parts of methanol, under nitrogen, is added 9.3 parts by volume of 50% aqueous sodium hydroxide, and the resulting reaction mixture is stored at room temperature for about 16 hours. At the end of that reaction period, the mixture is diluted with water, and the organic solvent is removed by distillation under reduced pressure. The residual aqueous mixture is diluted further with water, then is acidified by the addition of dilute hydrochloric acid. Extraction of that acidic mixture with chloroform produces an organic solution, which is washed successively with aqueous potassium bicarbonate and water, then is dried over anhydrous sodium sulfate and concentrated to dryness under reduced pressure. Purification of that solid crude product by recrystallization from benzene affords pure 17β-hydroxy-17α-methyl-2-oxaestra-5(10),9(11)-dien-3-one, melting at about 152–154° and displaying an ultraviolet absorption maximum at about 238 millimicrons.

EXAMPLE 23

To a solution of 2.79 parts of 17β-hydroxy-17α-methyl-2-oxestra-5(10),9(11)-dien-3-one in 64.7 parts of dichloromethane is added, at about 0°, 2.03 parts of m-chloroperbenzoic acid, and the resulting mixture is stored at that temperature for about 60 hours. The mixture is then diluted with benzene and washed with cold aqueous potassium carbonate. The organic layer is separated, washed with water, dried over anhydrous sodium sulfate and concentrated to dryness under reduced pressure. Crystallization of the resulting residue from ether-benzene affords the crude product, melting at about 169–180°. That material is triturated with hot ethyl acetate to afford a mixture of 9α,11α - epoxy - 17β-hydroxy-17α-methyl-2-oxaestr-5(10)-en-3-one and 5β,10β-epoxy-17β-hydroxy-17α-methyl-2-oxaestr-9(11)-en-3-one.

EXAMPLE 24

To 4.91 parts of the mixture of 9α,11α-epoxy-17β-hydroxy - 17α - methyl - 2 - oxaestr - 5(10 - en - 3 - one and 5β,10β - epoxy - 17β - hydroxy - 17α - methyl - 2 - oxaestr-9(11)-en-3-one obtained according to the procedure described in Example 8, there is added 109.5 parts of triethylamine, and heating at the reflux temperature with stirring in a nitrogen atmosphere is continued for about one hour. The solvent is removed by distillation under reduced pressure, and the residue is partitioned between chloroform and cold dilute aqueous potassium carbonate. The organic layer is separated, washed successively with cold dilute hydrochloric acid and water, dried over anhydrous sodium sulfate and stripped of solvent under reduced pressure. The resulting residue is dissolved in a mixture of 50 parts of pyridine and 73 parts of triethylamine, then is heated at the reflux temperature under nitrogen for about 35 minutes. Removal of the solvent by distillation under reduced pressure followed by dilution of the residue with cold dilute aqueous potassium carbonate and chloroform affords a two phase system. The organic layer is washed successively with cold dilute hydrochloric acid and water, then dried over anhydrous sodium sulfate and stripped of solvent under reduced pressure. Crystallization of the resulting residue from benzene-ethyl acetate results in 11α,17β-dihydroxy-17α-methyl-2-oxaestra-4,9(10)-dien-3-one. This compound is characterized by an ultraviolet absorption maximum at about 288 millimicrons with a molecular extinction coefficient of about 13,680.

EXAMPLE 25

To a solution of 2.59 parts of 11α,17β-dihydroxy-17α-methyl-2-oxaestra-4,9(10)-dien-3-one in 100 parts of pyridine is added 50 parts of acetic anhydride, and the resulting reaction mixture is stored at room temperature for about 16 hours. At the end of that time, water is added in order to decompose the excess reagent, and the resulting aqueous mixture is extracted with chloroform. The organic layer is separated, washed successively with cold dilute hydrochloric acid, dilute aqueous potassium carbonate and water, then dried over anhydrous sodium sulfate and stripped of solvent by distillation under reduced pressure. The resulting product is 11α-acetoxy-17β-hydroxy-17α-methyl-2-oxaestra-4,9(10)-dien-3-one.

EXAMPLE 26

A solution of 25 parts of lithium chloride in 540 parts of dimethylformamide is distilled until anhydrous, during which time approximately 50 parts by volume of distillate is collected. At the end of that time, 2.9 parts of 11α-acetoxy - 17β - hydroxy - 17α- methyl - 2 - oxaestra - 4,9(10)-dien-3-one is added, and the reaction mixture is heated at the reflux temperature, under nitrogen, for about one hour. The solvent is removed by distillation under reduced pressure, and the resulting residue is partitioned between water and benzene. The organic layer is separated, washed successively with dilute aqueous potassium bicarbonate and water, then dried over anhydrous sodium sulfate and distilled to dryness under reduced pressure. The resulting residue is dissolved in 16 parts of methanol, and 20 parts by volume of 10% aqueous sodium hydroxide is added. This reaction mixture is kept at room temperature for about one hour, at which time the pH is adjusted to 7–8 by the addition of solid carbon dioxide. That mixture is then diluted with water and extracted with chloroform. The chloroform layer is washed with water, dried over anhydrous sodium sulfate and concentrated to dryness under reduced pressure. The aqueous layer is acidified to pH 5 by the addition of acetic acid, then is extracted with chloroform. Washing of the organic solution successively with dilute aqueous potassium carbonate and water followed by drying over anhydrous sodium sulfate and concentration to dryness under reduced pressure affords a solid residue. The aforementioned solid residues are combined and chromatographed on silica gel. Elution with ethyl acetate followed by removal of the solvent under reduced pressure affords 17β-hydroxy-17α-methyl-2-oxaestra-4,9(10),11-trien-3-one, which is characterized by an ultraviolet absorption maximum at about 326 millimicrons and by the following structural formula

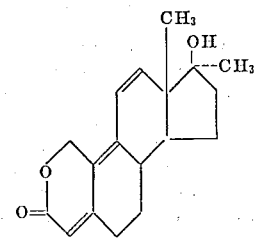

EXAMPLE 27

The substitution of an equivalent quantity of 17α-ethyl-17β-hydroxy-2-oxaestra-4,9(10)-dien-3-one in the procedure of Example 22 results in 17α-ethyl-17β-hydroxy-2-oxaestra-5(10),9(11)-dien-3-one.

EXAMPLE 28

By substituting an equivalent quantity of 17α-ethyl-17β-hydroxy-2-oxaestra-5(10),9(11)-dien-3-one and otherwise proceeding according to the processes of Example 23, there is obtained a mixture of 9α,11α-epoxy-17α-ethyl-17β-hydroxy-2-oxaestr-5(10)-en-3-one and 5β,10β-epoxy-17α-ethyl-17β-hydroxy-2-oxaestr-9(11)-en-3-one.

EXAMPLE 29

When an equivalent quantity of the mixture of 9α,11α-epoxy - 17α - ethyl - 17β - hydroxy - 2 - oxaestr - 5(10)-en-3-one and 5β,10β-epoxy-17α-ethyl-17β-hydroxy-2-oxaestr-9(11)-en-3-one is substituted in the procedure of Example 24, there is produced 17α-ethyl-11α,17β-dihydroxy-2-oxaestra-4,9(10)-dien-3-one.

EXAMPLE 30

The substitution of an equivalent quantity of 17α-ethyl-11α,17β - dihydroxy - 2 - oxaestra - 4,9(10) - dien - 3 - one in the procedure of Example 25 results in 11α-acetoxy-17α - ethyl - 17β - hydroxy - 2 - oxaestra - 4,9(10) - dien-3-one.

EXAMPLE 31

When an equivalent quantity of 11α-acetoxy-17α-ethyl-17β-hydroxy-2-oxaestra-4,9(10)-dien-3-one is substituted in the procedure of Example 26, there is produced 17α-ethyl - 17β - hydroxy-2-oxaestra-4,9(10),11-trien-3-one.

EXAMPLE 32

By substituting an equivalent quantity of propionic anhydride and otherwise proceeding according to the processes described in Example 17, there is obtained 2-oxa-17β-propionoxyestra-5(10),9(11)-dien-3-one.

EXAMPLE 33

When an equivalent quantity of 2 - oxa - 17β-propionoxyestra-5(10),9(11)-dien-3-one is substituted in the procedure of Example 18, there is produced 5β,10α-epoxy-2-oxa-17β - propionoxyester - 9(11)-en-3-one and 9α,11α-epoxy-2-oxa-17β-propionoxyester-5(10)-en-3-one.

EXAMPLE 34

By the substitution of an equivalent quantity of 9α,11α-epoxy - 2 - oxa-17β-propionoxyester-5(10)-en-3-one in the procedure of Example 19, there is obtained 11α-hydroxy-2-oxa-17β-propionoxyestra-4,9(10)-dien-3-one.

EXAMPLE 35

By substituting an equivalent quantity of 17β-hydroxy-2-oxaestra-4,9(10),11-trien-3-one and otherwise proceeding according to the processes of Example 25, there is produced 17β - acetoxy-2-oxaestra-4,9(10),11-trien-3-one.

EXAMPLE 36

The substitution of equivalent quantities of 17β-hydroxy - 2 - oxaestra-4,9(10),11-trien-3-one and propionic anhydride in the procedure of Example 25 results in 2-oxa-17β-propionoxyestra-4,9(10),11-trien-3-one.

EXAMPLE 37

A mixture containing 5 parts of 17β-hydroxy-2-oxaestra - 4,9(10) - dien - 3 - one, 5 parts of benzoyl chloride and 10 parts of pyridine is allowed to stand at room temperature for about 15 hours, then is diluted with water and stirred for about 2 hours. The reaction mixture is partitioned between chloroform and water, and the organic layer is separated, washed successively with dilute hydrochloric acid, aqueous potassium bicarbonate and water, then dried over anhydrous sodium sulfate and stripped of solvent by distillation under reduced pressure. The resulting residue is purified by crystallization from isopropyl alcohol to yield pure 17β-benzoyloxy-2-oxaestra-4,9(10)-dien-3-one, melting at about 176–179°.

EXAMPLE 38

A mixture of 10 parts of 17β-hydroxy-2-oxyestra-4,9(10)-dien-3-one with 5.74 parts of N-trimethylsilylacetamide is heated in a nitrogen atmosphere at 175–185° for about 20 minutes, then is concentrated to dryness by distillation under reduced pressure. The resulting residue is purified by crystallization from hexane to yield pure 17β-trimethylsilyloxy-2-oxaestra-4,9(10) - dien - 3-one, melting at about 92–93°.

EXAMPLE 39

To a solution of one part of 17β-hydroxy-2-oxaestra-4,9(10)-dien-3-one in 4 parts of pyridine is added 0.8 parts of adamantoyl chloride, and the resulting reaction mixture is stirred at room temperature for about 15 hours. The mixture is then diluted with water, stirred for about 2 hours and extracted with chloroform. The organic extract is washed successively with aqueous sodium sulfate and stripped of solvent under reduced pressure. The residue is dissolved in benzene and that solution is stirred with diatomaceous earth, then partially concentrated and diluted with cyclohexane to induce crystallization. The crystals are collected by filtration and dried to yield 17β-adamantoyloxy-2-oxaestra-4,9(10)-dien-3-one, melting at about 194–198°. It is represented by the following structural formula

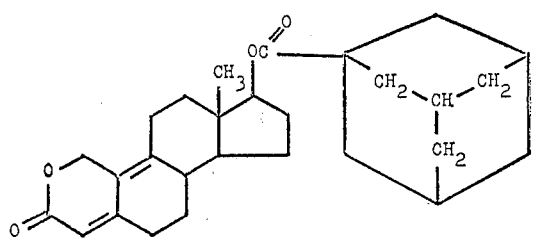

What is claimed is:
1. A compound of the formula

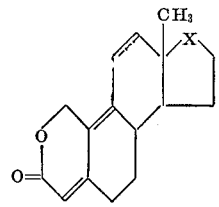

wherein the dotted line indicates the optional presence of an 11,12 double bond and X is selected from the group consisting of carbonyl and radicals of the formula

Y being a member of the class consisting of hydrogen, lower alkanoyl, benzoyl, adamantoyl and tri-(lower alkyl) silyl and Z being a member of the class consisting of hydrogen and lower alkyl.

2. As in claim 1, a compound of the formula

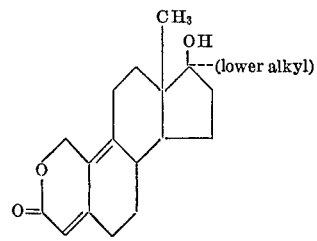

3. As in claim 1, a compound of the formula

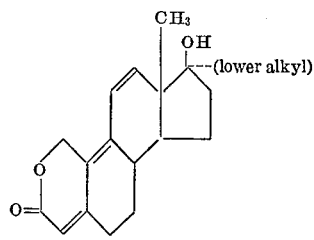

4. As in claim 1, a compound of the formula

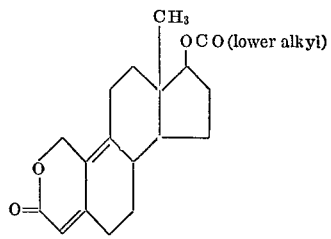

5. As in claim 1, a compound of the formula

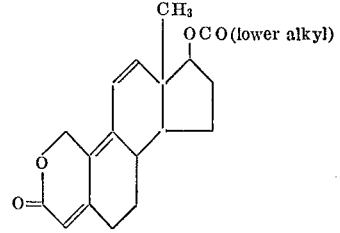

6. As in claim 1, the compound which is 2-oxaestra-4,9(10)-diene-3,17-dione.

7. As in claim 1, the compound which is 17β-hydroxy-2-oxaestra-4,9(10)-dien-3-one.

8. As in claim 1, the compound which is 17β-hydroxy-17α,methyl-2-oxaestra-4,9(10)-dien-3-one.

9. As in claim 1, the compound which is 17β-acetoxy-2-oxaestra-4,9(10)-dien-3-one.

10. As in claim 1, the compound which is 17β-hydroxy-2-oxaestra-4,9(10),11-triene-3-one.

11. As in claim 1, the compound which is 17β-hydroxy-17α-methyl-2-oxaestra-4,9(10),11-trien-3-one.

12. As in claim 1, the compound which is 17β-benzoyloxy-2-oxaestra-4,9(10)-dien-3-one.

13. As in claim 1, the compound which is 17β-trimethylsilyloxy-2-oxaestra-4,9(10)-dien-3-one.

References Cited

UNITED STATES PATENTS 3,246,014  4/1966  Jung et al. _____ 260—343.2

JAMES A. PATTEN, *Primary Examiner.*